(12) United States Patent
Phillips et al.

(10) Patent No.: US 7,806,006 B2
(45) Date of Patent: Oct. 5, 2010

(54) BICYCLE TORQUE MEASURING SYSTEM

(75) Inventors: Robert Ryan Phillips, Grand Rapids, MI (US); Coty W. Lindell, Allendale, MI (US); Adam L. Miller, Grandville, MI (US)

(73) Assignee: Grand Valley State University, Allendale, MI (US)

( * ) Notice: Subject to any disclaimer, the term of this patent is extended or adjusted under 35 U.S.C. 154(b) by 0 days.

(21) Appl. No.: 11/936,847

(22) Filed: Nov. 8, 2007

(65) Prior Publication Data

US 2009/0120210 A1 May 14, 2009

(51) Int. Cl.
*G01L 1/22* (2006.01)
*G01L 5/26* (2006.01)
*B62M 1/02* (2006.01)

(52) U.S. Cl. ............... 73/862.338; 280/259; 73/379.07
(58) Field of Classification Search ............ 73/862.338, 73/379.01; 482/8; 280/200, 209, 259, 260, 280/261
See application file for complete search history.

(56) References Cited

U.S. PATENT DOCUMENTS

| 4,463,433 | A | * | 7/1984 | Hull et al. ................. 702/41 |
| 4,811,612 | A | | 3/1989 | Mercat |
| 4,966,380 | A | | 10/1990 | Mercat |
| 5,016,478 | A | | 5/1991 | Mercat |
| 5,027,303 | A | * | 6/1991 | Witte ..................... 702/44 |
| 5,031,455 | A | | 7/1991 | Cline |
| 5,816,599 | A | | 10/1998 | Soejima et al. |
| 5,992,553 | A | * | 11/1999 | Morrison ................ 180/206 |
| 6,263,992 | B1 | | 7/2001 | Li |
| 6,356,848 | B1 | | 3/2002 | Cote et al. |
| 6,418,797 | B1 | | 7/2002 | Ambrosina et al. |
| 6,644,135 | B1 | | 11/2003 | Kishimoto et al. |
| 6,863,291 | B2 | * | 3/2005 | Miyoshi ................... 280/283 |
| 2005/0080566 | A1 | * | 4/2005 | Vock et al. ................ 702/2 |
| 2009/0120208 | A1 | * | 5/2009 | Meyer ................. 73/862.045 |

FOREIGN PATENT DOCUMENTS

WO WO8900401 1/1989

OTHER PUBLICATIONS

SRM User Manual. pp. 1-40. May 2003.*
R.F. Reiser II, M.L. Peterson, and J.P. Broker. "Instrumented bicycly pedals for dynamic measurement of propulsive cycling loads." Sports Engineering. (2003) 6, pp. 41-48.*
"Data Acquisition and Conversion." J. Webster (ed.) Wiley Encyclopedia of Electrical and Electronics Engineering. 1999.*
SRM 2006 User Manual, pp. 1-21 and 120-131, Nov. 30, 2006.

* cited by examiner

*Primary Examiner*—Lisa M Caputo
*Assistant Examiner*—Punam Roy
(74) *Attorney, Agent, or Firm*—Price, Heneveld, Cooper, DeWitt & Litton, LLP

(57) ABSTRACT

Strain gauges are mounted on each crank arm of the bicycle and provide a measure of the torque applied to each crank arm. In a preferred embodiment, strain gauges are mounted on opposite edges of each crank arm, which includes a self-contained power, electrical circuitry, and a wireless transmitter for transmitting the strain measurement information to a main controller. The main controller includes a wireless transceiver for transmitting and receiving data from both the left and right crank arms and external devices. Memory is also included for storing such data for subsequent analysis to determine the individual leg performance of a cyclist during a race or training session.

9 Claims, 5 Drawing Sheets

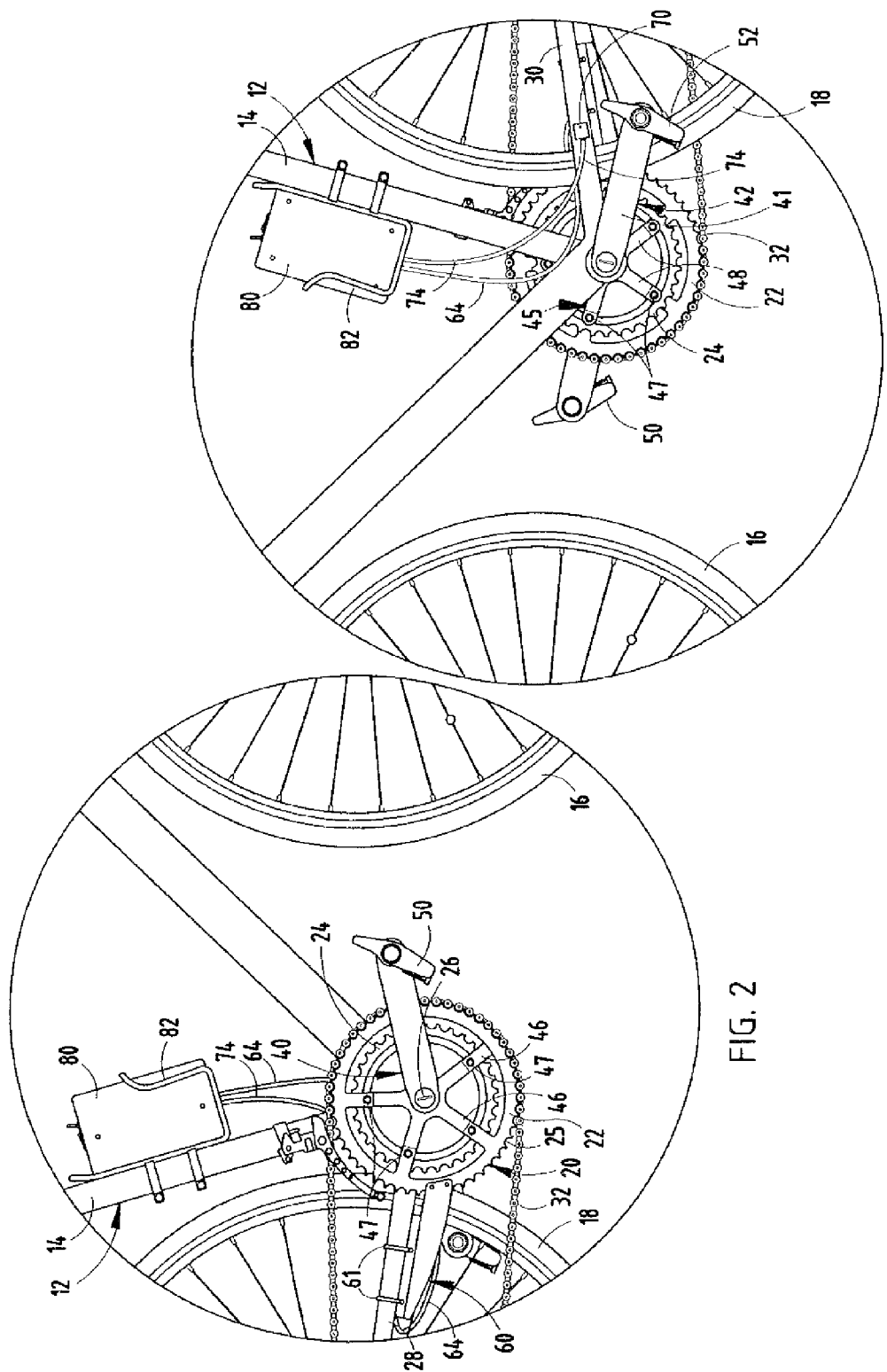

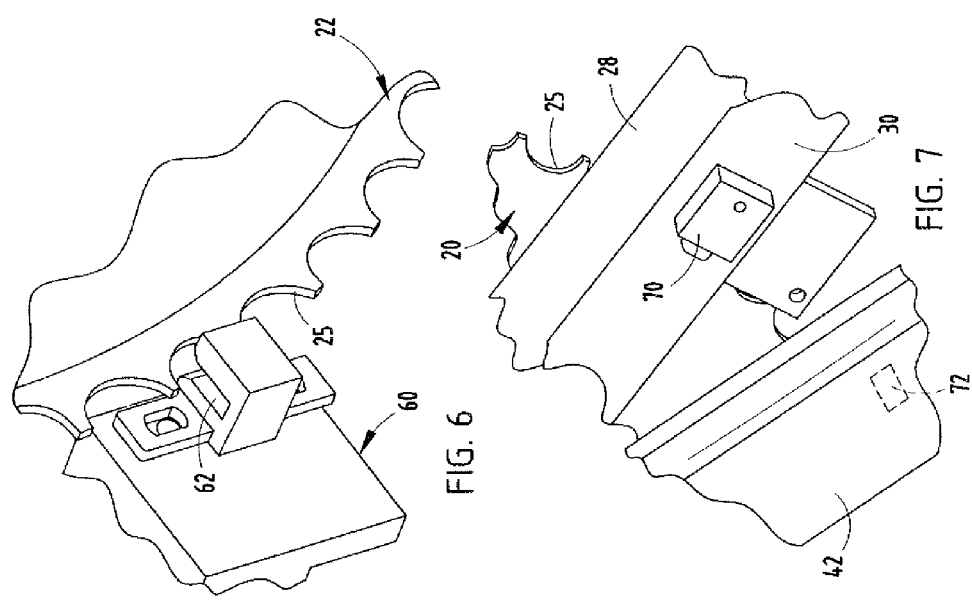
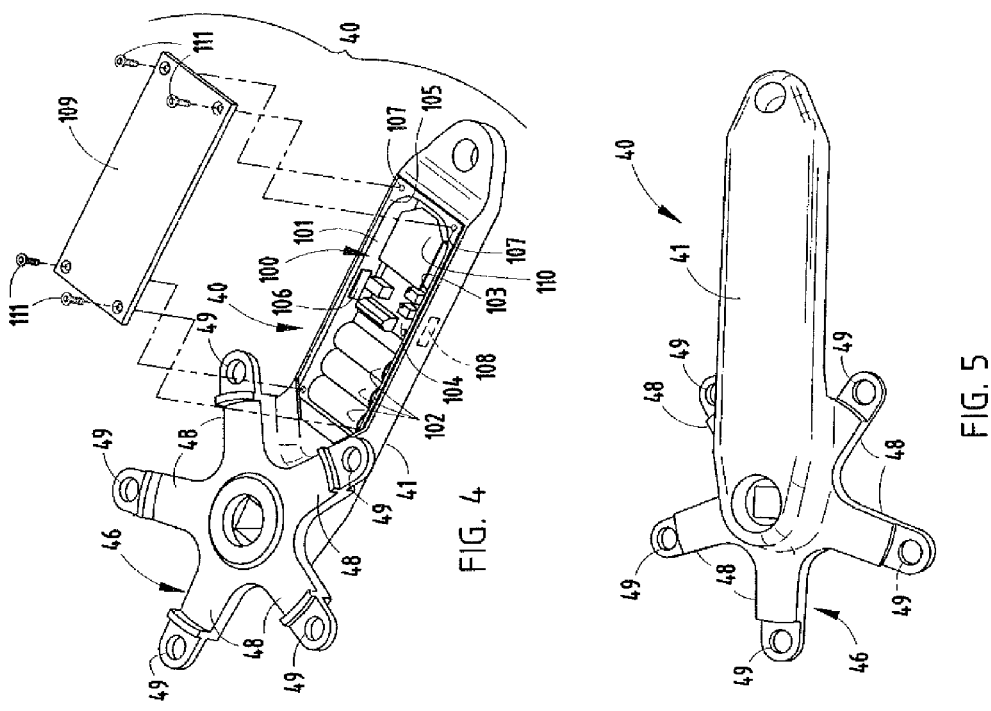

US 7,806,006 B2

BICYCLE TORQUE MEASURING SYSTEM

BACKGROUND OF THE INVENTION

The present invention relates to a system for measuring torque applied by each leg of the rider to the drive sprocket of a bicycle.

Bicycle races have become an increasingly competitive sport where athletes involved train for several months and frequently are members of teams which compete professionally. Professional and other competitive racers employ a variety of training equipment to determine the total amount of power they deliver to the bicycle. There have been several proposals to record and allow the cyclist or trainer to analyze an individual cyclist's output power. The measurement methods employed include torque monitors mounted to the hubs of the bicycle to measure the power output to the wheels, strain gauges mounted within the sprocket spiders, chain tension measuring devices, and torsion sensors in the bottom bracket of the bicycle. These products are all somewhat costly and only display the total amount of power generated by the cyclist, therefore, the cyclist cannot evaluate individual leg performance.

Consequently, there remains a need for a system which provides individual (i.e., left and right leg) applied torque measurements, such that the data can be collected and subsequently analyzed to allow the user to improve their performance. Such a system must be robust and capable of withstanding the cycling environment encountered while collecting data during the course of a race or training exercise.

SUMMARY OF THE INVENTION

The system of the present invention provides such an improved torque measuring system by measuring the torque applied to each crank arm by the cyclist. In one embodiment, at least one strain gauge is mounted on each crank arm of the bicycle and provides a signal indicative of strain which is then correlated to torque information for each leg. In a preferred embodiment, strain gauges are mounted on opposite edges of each crank arm. The system of the preferred embodiment includes self-contained power, electrical circuitry, a wireless transmitter coupled to the strain gauges, and a main controller positioned remote from the crank arms. The main controller includes a wireless transceiver for transmitting and receiving data from both the left and right crank arms and external devices. Also, memory is included for storing such data for subsequent analysis used to determine the individual leg performance of a cyclist during a race or training session.

In the preferred embodiment of the invention, the main controller includes a microcontroller which is coupled to sensors to determine the instantaneous position of the individual crank arms. One sensor determines a reference position (such as top dead center for a pedal) and another sensor measures the sprocket position at several intervals. In one embodiment, this is achieved by having the teeth of the sprocket interrupt an optical sensor, such that each tooth provides a pulse for determining the position of the sprocket and, therefore, the position of each crank arm and pedal. The aforementioned components allow the torque applied by each leg of the rider to be recorded throughout each pedaling cycle and rotation of the sprocket.

With such a system, therefore, significant data can be collected and stored for each leg of the cyclist to provide individual torque information which can subsequently be analyzed and used for improving the cyclist's performance. These and other features, objects and advantages of the present invention will become apparent upon reading the following description thereof together with reference to the accompanying drawings.

BRIEF DESCRIPTION OF THE DRAWINGS

FIG. 2 is an enlarged fragmentary view of the encircled area II of FIG. 1;

FIG. 3 is an enlarged fragmentary left side view of the encircled area II of the bicycle shown in FIG. 1;

FIG. 4 is an exploded perspective view of one of the crank arms of the present invention, shown with the cover removed to expose the circuitry for detecting and transmitting information used for the calculation of the individual torque curves for said crank arms;

FIG. 5 is an opposite side perspective view of the crank arm shown in FIG. 4;

FIG. 6 is an enlarged fragmentary perspective view of the sensor for determining the angular position of the bicycle sprocket shown in FIGS. 1-2;

FIG. 7 is an enlarged fragmentary perspective view of the reference position sensor, also shown in FIG. 3;

DETAILED DESCRIPTION OF THE PREFERRED EMBODIMENT

Figure 1:
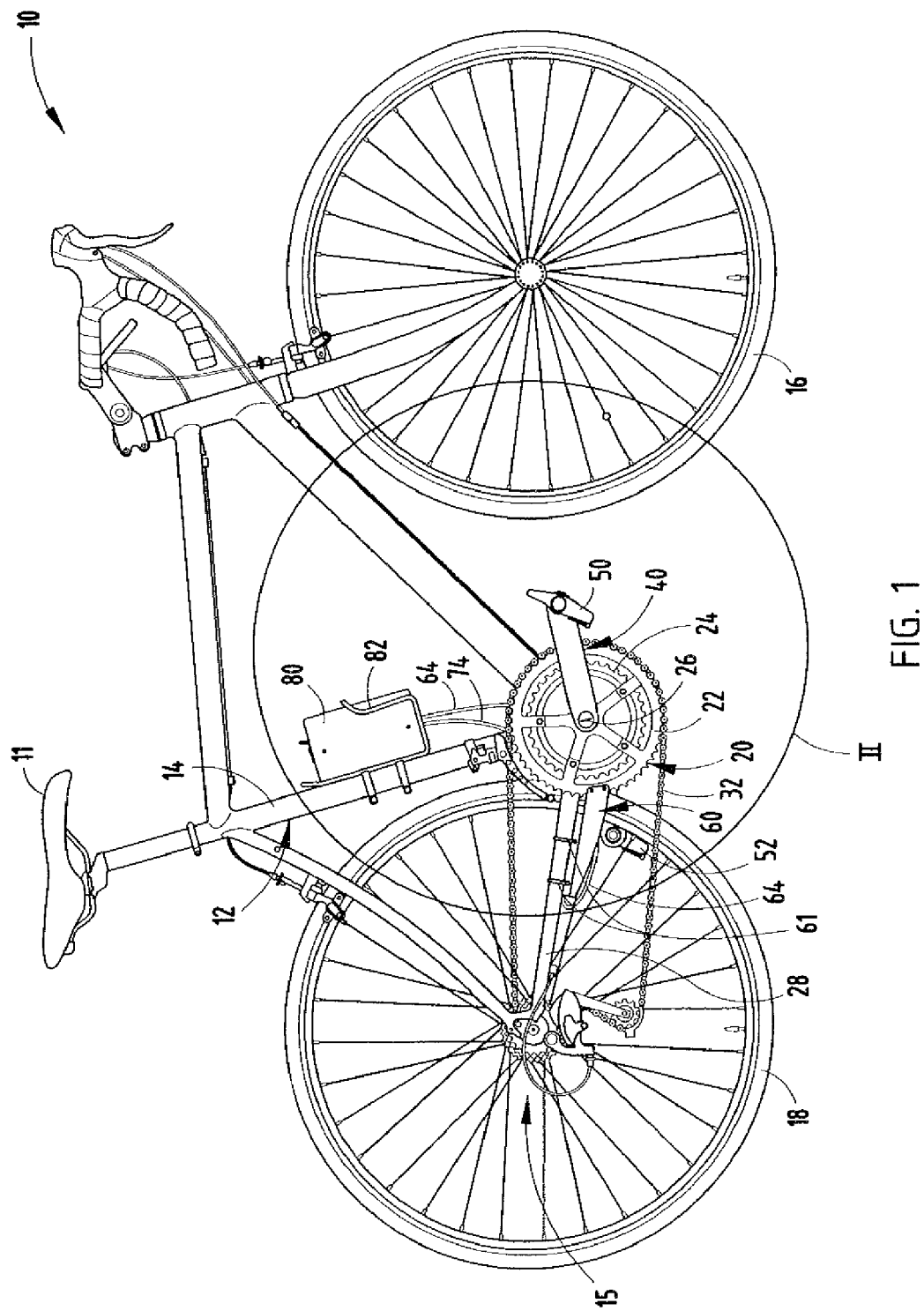
FIG. 1 is a right side elevational view of a bicycle incorporating the torque sensing and recording system of the present invention.

Referring initially to FIGS. 1-3, there is shown a bicycle 10 embodying the present invention. Bicycle 10 includes a racing frame 12 having a seat tube 14 supporting a seat 11, front wheel 16, a rear wheel 18, and a sprocket assembly 20, including an outer sprocket 22, an inner sprocket 24 with an axle 26 extending through the hub of frame 12 and keyed to sprockets 22 and 24. Frame 12 also includes a pair of horizontally and rearwardly extending frame members 28 and 30 which support a rear axle and derailer assembly 15 (FIG. 1) associated with the bicycle. The conventional crank arms associated with the sprockets, which drive chain 32, are replaced with crank arms 40 and 42 embodying the present invention. Crank arm 40 is mounted to sprockets 22 and 24 and to axle 26. Crank arm 40, which is shown in detail in FIGS. 4 and 5, includes a mounting spider 46 with five equally spaced legs 48 having apertures 49 for securing the spider to the aligned apertures of outer and inner sprockets 22 and 24 of bicycle 10, as shown in FIG. 1, utilizing conventional fastening bolts 47. Crank arm 42, as seen in FIG. 3, is directly mounted and keyed to axle 26. Crank arms 40 and 42 receive, at their ends remote from axle 26, pedals 50 and 52, respectively. Crank arms 40 and 42, other than the spider for mounting crank arm 40 to sprocket 22, are substantially identical and only area 40 will be described in detail below.

Mounted to frame member 28 by straps 61 is a sprocket position sensor bracket 60, which includes, as best seen in FIG. 6, a slotted optical detector 62 through which the teeth 25 of sprocket 22 pass. The detector includes an LED and photo diode between which the teeth 25 pass to interrupt the light beam. Detector 62, thereby, provides a timing signal for each tooth 25 which is employed by electrical circuitry to provide an angular position signal for each of the pedals 50 and 52 during a cycle of rotation. Frame member 30, on the opposite side of the bicycle (FIG. 3), includes a Hall effect sensor 70, as seen in FIG. 7, which responds to a magnet 72 embedded in crank arm 42 such that each time crank arm 42 is aligned with frame member 30, a reference signal is provided to the electrical circuitry indicating the home position of the pedal system. This can be referenced to the top dead center position of one of the pedals by suitable signal processing, such that not only is an incremental but significant number of angular positions provided by detector 62, a reference position of the pedals is provided by sensor 70.

Each of the crank arms 40 and 42, as discussed below, include a battery-powered electrical circuit. Strain gauges are mounted to the opposite sides of the inner faces of a pocket formed in the crank arms and coupled to the electrical circuit, which includes a wireless transmitter in each of the crank arms to transmit the collected strain information to a main controller 80 (FIGS. 1-3, 8, and 10). Main controller 80 is mounted to post 14 of bicycle frame 12 by means of a cradle assembly 82.

Figure 9:
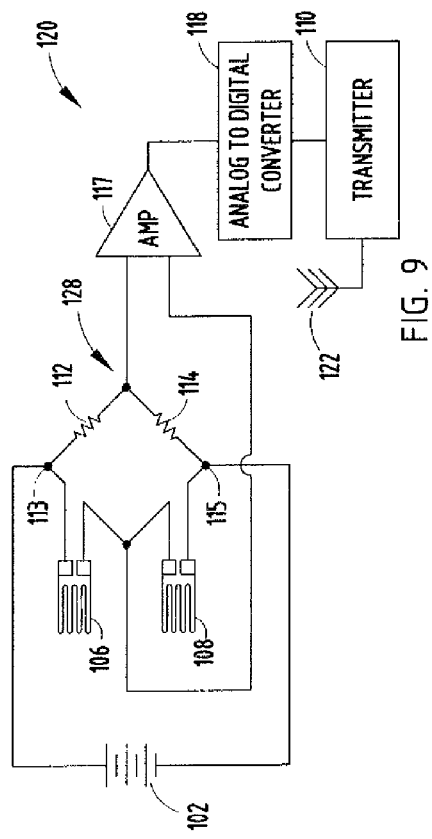
FIG. 9 is a block electrical circuit diagram of one of the electrical circuits for acquiring torque information contained within the crank arms.

The optical detector 62, which can be a Honeywell Model HOA2004, is coupled by a conductor 64 directly to a microcontroller 83 (FIG. 10) in the main controller 80, while the Hall effect sensor 70, which can be a Hamlin Model 55110, is likewise coupled by conductor 74 to the microcontroller 83. As discussed in greater detail below, the right and left crank arms, 40, 42, through the circuit seen in FIG. 9, provide wireless data as to the instantaneous strain information detected by each of the crank arm circuits, as described in connection with FIG. 9 below, by a wireless link to the main controller 80. The main controller stores the data collected over a period of time which may include an entire race or training session. This data can subsequently be downloaded onto a personal computer 90 (FIG. 8) for processing, resulting in what can be displayed or printed as polar torque diagrams, such as shown in diagrams 92 and 94 in FIGS. 11A and 11B. The diagrams are displays for one pedaling cycle for the left and right legs, respectively, of the torque applied through the pedals 52 and 50, respectively, to the axle 26 by the force of the user's legs. If the polar diagrams indicate a significant deviation from one leg to the other or abnormal torque deviations during pedaling cycle(s), the information can be employed by the cyclist and/or trainer to change the cyclist's pedaling patterns and/or increase leg strength or the like to arrive at somewhat consistent power being applied by the cyclist's legs to the drive chain 32 for propelling the bicycle. The diagram in FIG. 11A represents a relatively unbalanced torque output from one leg over one rotational cycle of pedaling. In contrast, FIG. 11B represents a relatively balanced torque output from one leg over one rotational cycle of pedaling, which is a desired result from utilizing the information provided by the system of the present invention.

Having described the major components of the system, a description of the crank arm assemblies which provide the torque information follows in connection with FIGS. 4, 5, 8, and 9. The crank arms 40 and 42 are substantially identical with the exception of the use of the spider 45 with legs 48 for attaching the right crank arm 40 to the sprocket 22 by fastening bolts 47 (FIGS. 2 and 3). The left crank arm 42 is keyed and mounted directly to the sprocket axle 26. The identical circuitry and mounting system for the circuitry is described only in connection with crank arm 40. Each of the crank arms 40, 42 include a central arm 41 machined or cast from an aluminum alloy or some other lightweight, strong material. Each of the crank arms also include a generally rectangular pocket 100 (FIG. 4), which receives the electrical circuitry including batteries 102 for powering the circuit, a circuit board 104 containing the circuit 120 of FIG. 9. A first strain gauge 106 is mounted on the inside wall 101 of pocket 100, and a second strain gauge 108 (shown in phantom form) is mounted to the inside of the opposite wall 103 of pocket 100. The strain gauges can be Omega Model SGD-7/350-LY13, which are attached to the walls 101 and 103 by an adhesive formulated for strain gauge application. The pocket 100 is sealably covered by a cover plate 109 (FIG. 4) utilizing fastening screws 111 extending through cover plate 109 and into apertures 107 in arms 41.

As seen in FIG. 9, strain gauges 106, 108 form two legs of a Wheatstone bridge circuit 128, which includes two fixed resistors 112, 114. Two strain gauges are used to increase sensitivity and measurement accuracy and are employed to complete half of Wheatstone bridge 128. Circuit 120 of FIG. 9 represents the same circuit used for each of the crank arms 40, 42. The batteries 102 supply a voltage V at opposite nodes of the bridge, such that strain placed on each of the crank arms results in an analog voltage variation at nodes 113 and 115 representing the differential strain on each side of each of the crank arms and, therefore, the individual left and right torques applied to axle 26 by the cyclist. The signal from bridge circuit 128 is applied to a differential amplifier 117, and subsequently the combined amplified analog signal is applied to an analog to digital converter 118. The strain information from strain gauges 106 and 108, which balance out and cancel longitudinally transmitted forces and measure only the lateral forces applied to the crank arm through pedals 50 and 52, provide the desired torque information, as shown in FIGS. 11A and 11B. The digital bit stream from converter 118 is applied to a transmitter 110 which is coupled to an antenna 122. The transmitter can be an XBee Model XB24 powered by batteries 102 and operating at an RF frequency of about 2.4 GHz. The transmitters for each crank arm are uniquely addressed to identify the left or right crank arm to the main controller 80.

In addition to the circuitry mounted as shown in FIGS. 4 and 9, the left crank arm 42 includes a magnet 72 (FIG. 7) mounted near the end of the crank arm and which aligns with the Hall effect sensor 70 as the crank arm passes the Hall effect sensor mounted on frame member 30.

Figure 10:
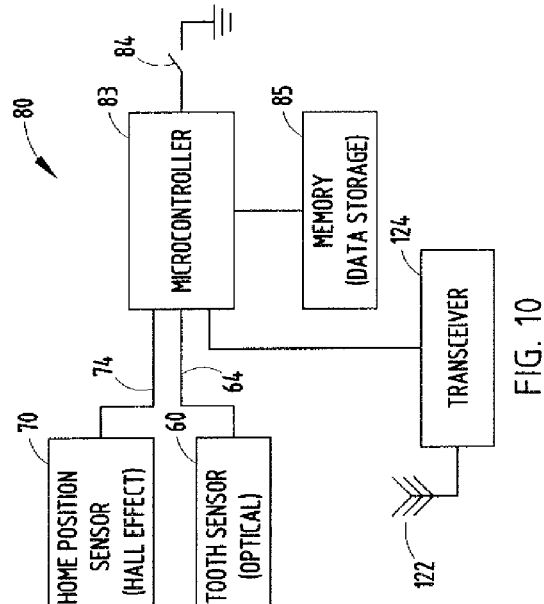
FIG. 10 is a block electrical circuit diagram of the main controller, shown in FIG. 8.
Figure 8:
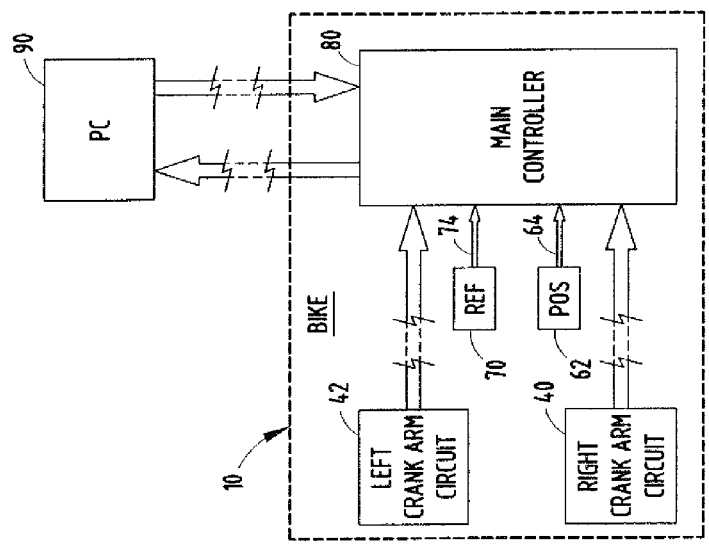
FIG. 8 is a block electrical diagram of the overall system of the present invention.
Figure 11B:
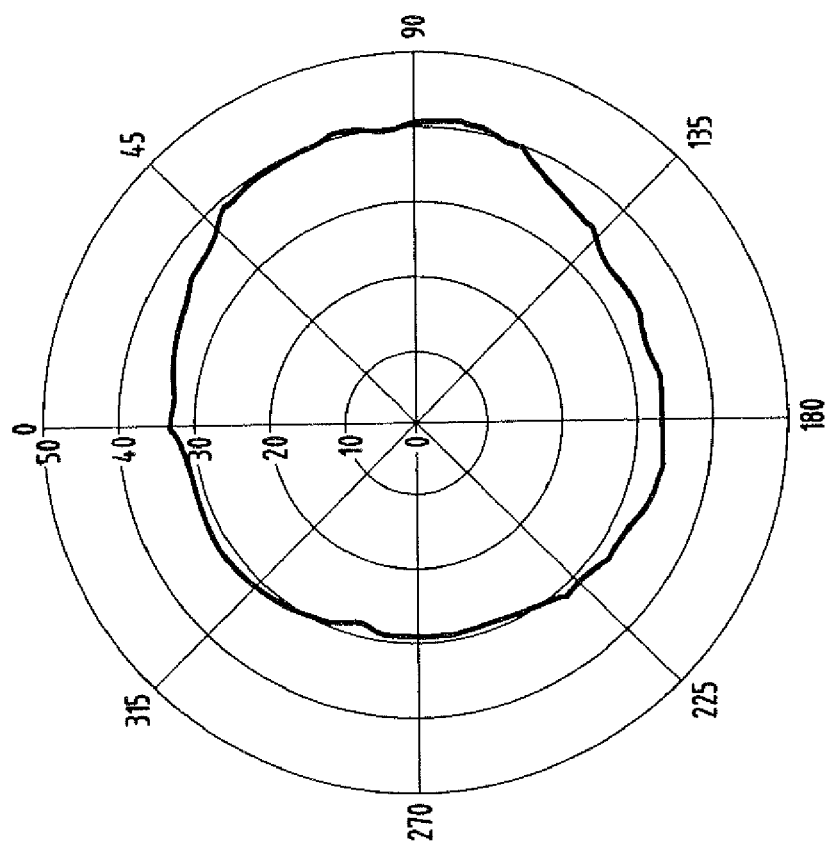
FIGS. 11A and 11B are left and right polar torque diagrams generated from data collected and stored by the system of the present invention.
Figure 11A:
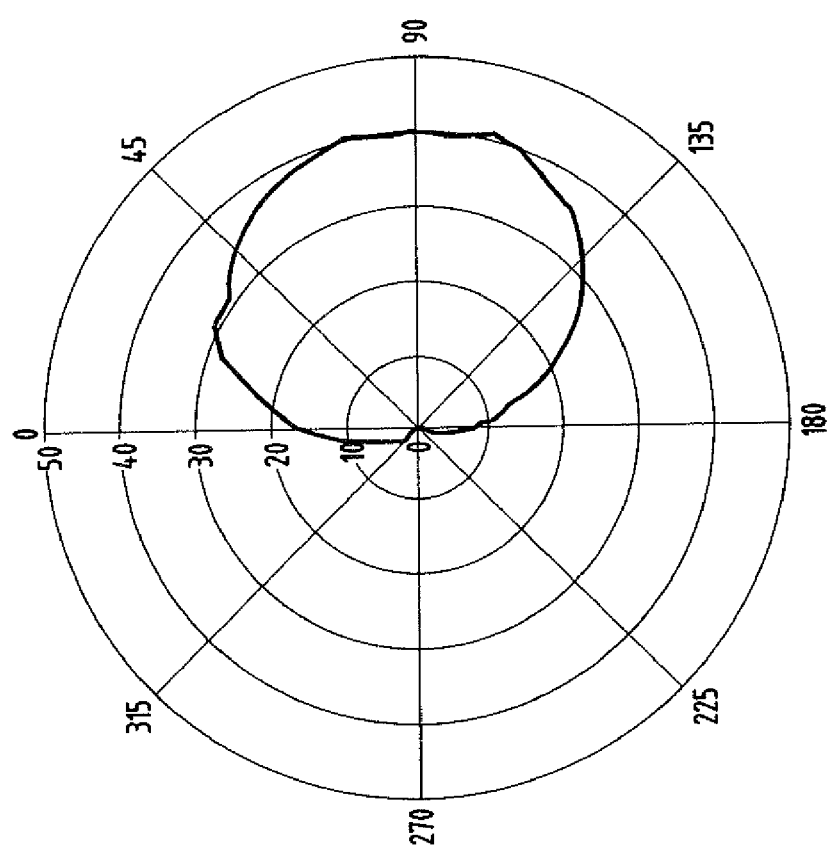

The digital data transmitted from each of the crank arm transmitters 110 is received by antenna 122 of the main controller 80 circuit shown in FIG. 10. The received signal is applied to a transceiver 124 which demodulates the digital data and applies the received data to microcontroller 83. Microcontroller 83 is coupled to a suitable memory circuit 85 for storing the strain gauges measurements from each of the crank arms during a sequence of operation. A start/stop switch 84 is coupled to microcontroller 83 and is employed by the operator of the bicycle to initiate the storage sequence and terminate the storage of data upon completion of a testing period. Switch 84 may be held down for a period of time, such as two seconds, to activate the microcontroller 83 to transmit the stored data through transceiver 124, as illustrated in FIG. 8, to a PC 90. An external computer, such as PC 90, can be employed for analyzing the data and providing a graphic user interface (GUI) output of data, including the polar diagrams shown in FIGS. 11A and 11B. The scale of the torque diagrams of FIGS. 11A and 11B is in foot/pounds. Typically, 50% of a cyclist's propulsive impulse is delivered between 60° and 120° from top dead center (0° in the diagrams). The diagram of FIG. 11A represents this typical pedaling situation, while FIG. 11B indicates a somewhat uniform amount of torque being provided by the cyclist.

Thus, with the system of the present invention, a cyclist's individual efforts for the left and right legs can be monitored and stored over a period of time, such as during a race or training exercise, and the information can be subsequently analyzed by the cyclist and/or trainer to improve the cyclist's performance. By providing individual leg information, as opposed to combined information, the cyclist's performance efforts can be customized and individualized for optimizing the propulsion of the bicycle. Providing a wireless interconnection between the individual crank arms and a main controller allows for a miniaturization of the circuitry within the crank arms. In some embodiments, it may be possible to include sufficient memory within the individual crank arms such that the data can be stored within the crank arm circuits themselves and subsequently transmitted to an external PC for an analysis.

It will become apparent to those skilled in the art that these and other modifications to the preferred embodiment of the invention as described herein can be made without departing from the spirit or scope of the invention as defined by the appended claims.

The invention claimed is:

1. A torque measurement system for a bicycle comprising:
a first crank arm and a second crank arm extending between a drive axle and pedals of the bicycle, wherein each of said first and second crank arms includes at least one stain gauge;
an electrical circuit on each crank arm coupled to said strain gauges and including a transmitter for transmitting strain measurement information to a main controller representative of the strain and, therefore, the torque exerted on the axle by the pedals;
a main controller mounted to the bicycle and including a receiver for receiving information from said transmitters of said first and second crank arms and further including a first sensor for detecting the position of a bicycle drive sprocket as it rotates through a cycle of operation and supplying information to said main controller relative to the detected position of said sprocket, wherein said first sensor is an optical sensor and wherein teeth of the sprocket interrupt the light beam of the optical sensor to provide timing signals representative of the position of the sprocket as it rotates through a cycle of operation; and
an index position sensor for supplying information as to a reference location of the crank arm with respect to a cycle of operation, wherein said index position sensor is a Hall effect sensor positioned on the frame of the bicycle and wherein one of said first and second crank arms includes a magnet for providing a signal from said Hall effect sensor when said one crank arm passes a predetermined location during a cycle of operation.

2. The system as defined in claim 1 wherein the main controller includes a microcontroller and memory for storing data over a time period of several cycles of operation.

3. The system as defined in claim 2 wherein said main controller includes a transceiver for receiving information from each of said crank arm transmitters and for transmitting signal information to a remote computer for analysis.

4. A torque measurement system for a bicycle having a frame, said system comprising:
first and second crank arms extending between a drive axle and pedals of the bicycle, said crank arms each including strain gauges mounted on opposing longitudinal sides of said crank arms; and
an electrical circuit for storing all of said strain gauge measurement information and, therefore, the individual torque exerted on the axle by each crank arm on the drive axle, wherein each crank arm includes a pocket formed therein and wherein said strain gauges are mounted on the inside walls of said pocket which are parallel to sides of said crank arm and further including a first sensor mounted to the bicycle frame for detecting the position of a bicycle drive sprocket as it rotates through a cycle of operation and supplying information relative to the detected position of said sprocket;
an index position sensor for supplying information as to a reference location of at least one crank arm with respect to a cycle of operation; and
wherein said first sensor is an optical sensor and wherein teeth of the sprocket interrupt the light beam of the optical sensor to provide timing signals representative of the position of the sprocket as it rotates through a cycle of operation.

5. A torque measurement system for a bicycle having a frame, said system comprising:
first and second crank arms extending between a drive axle and pedals of the bicycle, said crank arms each including strain gauges mounted on opposing longitudinal sides of said crank arms; and
an electrical circuit for storing all of said strain gauge measurement information and, therefore, the individual torque exerted on the axle by each crank arm on the drive axle, wherein each crank arm includes a pocket formed therein and wherein said strain gauges are mounted on the inside walls of said pocket which are parallel to sides of said crank arm and further including a first sensor mounted to the bicycle frame for detecting the position of a bicycle drive sprocket as it rotates through a cycle of operation and supplying information relative to the detected position of said sprocket;
wherein said first sensor is an optical sensor and wherein teeth of the sprocket interrupt the light beam of the optical sensor to provide timing signals representative of the position of the sprocket as it rotates through a cycle of operation; and
an index position sensor for supplying information as to a reference location of at least one crank arm with respect to a cycle of operation, wherein said index position sensor is a Hall effect sensor positioned on the frame of the bicycle and wherein one of said crank arms includes a magnet for providing a signal from said Hall effect sensor when the crank arm passes a predetermined location during a cycle of operation.

6. A torque measurement system for a bicycle comprising:
crank arms extending between a drive axle and the pedals of the bicycle, said crank arms each having a longitudinal axis and at least one strain gauge positioned on each of said crank arms in alignment with said longitudinal axis;
a pocket formed in each crank arm;
an electrical circuit mounted in each of said pockets and coupled to a strain gauge on an associated crank arm for obtaining information representative of the strain and, therefore, the torque exerted on the axle by each crank arm, wherein said circuit includes a transmitter and power supply for transmitting strain information to a main controller;
a main controller mounted to a bicycle and including a receiver for receiving information from said transmitters of said crank arms;

a first sensor for detecting the position of the bicycle drive sprocket as it rotates through a cycle of operation and supplying information to said main controller relative to the detected position of said sprocket, wherein said first sensor is an optical sensor and wherein teeth of the sprocket interrupt the light beam of the optical sensor to provide timing signals representative of the position of the sprocket as it rotates through a cycle of operation; and an index position sensor for supplying information as to a reference location of at least one of the crank arms with respect to a cycle of operation, wherein said index position sensor is a Hall effect sensor positioned on the frame of the bicycle and wherein one of said crank arms includes a magnet for providing a signal from said Hall effect sensor when the crank arm passes a predetermined location during a cycle of operation.

7. The system as defined in claim 6 wherein said main controller includes a microcontroller and memory for storing data over a time period of several cycles of operation.

8. The system as defined in claim 7 wherein said main controller includes a transceiver for receiving information from each of said crank arm transmitters and for transmitting signal information to a remote computer for analysis.

9. A torque measurement system for a bicycle having a pair of crank arms coupled to a drive sprocket coupled to a drive axle, said system comprising:

crank arms extending between a drive axle and the pedals of the bicycle, said crank arms each having a longitudinal axis;

an electrical circuit coupled to each of said crank arms for providing information in a binary format representative of the torque exerted on the axle which information is associated with an address identifying each crank arm;

a first sensor for detecting the teeth of the bicycle sprocket as it rotates through a cycle of operation;

a second sensor for detecting a reference position of at least one of said crank arms;

a microprocessor coupled to said electrical circuit and to said first and second sensors for storing instantaneous torque information for each crank arm through 360° of rotation of said sprocket as detected by said first and second sensors; and a computer for coupling to said microprocessor and programmed for analyzing information stored by said microprocessor and outputting signals which provide polar diagrams of the torque applied to each crank arm through at least one cycle of operation.

* * * * *

UNITED STATES PATENT AND TRADEMARK OFFICE
CERTIFICATE OF CORRECTION

| | | |
|---|---|---|
| PATENT NO. | : 7,806,006 B2 | Page 1 of 1 |
| APPLICATION NO. | : 11/936847 | |
| DATED | : October 5, 2010 | |
| INVENTOR(S) | : Phillips et al. | |

It is certified that error appears in the above-identified patent and that said Letters Patent is hereby corrected as shown below:

Col. 3, line 17, "include" should be --includes--;

Col. 3, line 65, "is" should be --are--;

Col. 3, line 67, "include" should be --includes--;

Col. 4, line 2, "include" should be --includes--;

Col. 4, line 33, "provide" should be --provides--;

Col. 4, line 52, "gauges" should be --gauges'--; and

Col. 5, claim 1, line 29, "stain" should be --strain--.

Signed and Sealed this

Thirtieth Day of November, 2010

David J. Kappos
*Director of the United States Patent and Trademark Office*